United States Patent
Höckerdal et al.

(10) Patent No.: US 12,146,446 B2
(45) Date of Patent: Nov. 19, 2024

(54) CONTROLLING VALVE ACTUATION OF AN INTERNAL COMBUSTION ENGINE TO PREVENT COMPRESSOR SURGE

(71) Applicant: Scania CV AB, Södertälje (SE)

(72) Inventors: Erik Höckerdal, Södertälje (SE); Stefan Orrling, Stockholm (SE); Oskar Leufven, Södertälje (SE); Erik Lind, Stockholm (SE); John Kroon, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/265,014

(22) PCT Filed: Nov. 5, 2021

(86) PCT No.: PCT/SE2021/051106
§ 371 (c)(1),
(2) Date: Jun. 2, 2023

(87) PCT Pub. No.: WO2022/124958
PCT Pub. Date: Jun. 16, 2022

(65) Prior Publication Data
US 2024/0011428 A1 Jan. 11, 2024

(30) Foreign Application Priority Data
Dec. 11, 2020 (SE) .................... 2051445-1

(51) Int. Cl.
*F02D 13/02* (2006.01)
*F02B 37/12* (2006.01)
*F02D 41/00* (2006.01)

(52) U.S. Cl.
CPC .......... *F02D 13/0219* (2013.01); *F02B 37/12* (2013.01); *F02D 13/0203* (2013.01);
(Continued)

(58) Field of Classification Search
CPC .. F02D 41/0007; F02D 13/02; F02D 13/0203; F02D 13/0215; F02D 13/0219;
(Continued)

(56) References Cited

U.S. PATENT DOCUMENTS

| 6,105,555 A | 8/2000 | Weber et al. |
| 8,714,123 B2 | 5/2014 | Rollinger et al. |

(Continued)

FOREIGN PATENT DOCUMENTS

| EP | 1852593 A1 | 11/2007 |
| EP | 2050943 A1 | 4/2009 |

(Continued)

OTHER PUBLICATIONS

Scania CV AB, International Patent Application No. PCT/SE2021/051106, International Preliminary Report on Patentability, Jun. 13, 2023.

(Continued)

*Primary Examiner* — Laert Dounis
(74) *Attorney, Agent, or Firm* — Moore & Van Allen PLLC; W. Kevin Ransom

(57) ABSTRACT

The disclosure concerns a method and a control arrangement for controlling valve actuation of an ICE comprising an exhaust valve, an intake valve, and a turbo compressor. The method comprises and the control arrangement is configured to: limiting/limit valve actuation changes of the exhaust and intake valves based on compressor data including surge limit data for the turbo compressor and one or both of a current turbo compressor rotational speed and a current turbo compressor pressure ratio, to maintain a turbo compressor mass flow above a limit mass flow value.

20 Claims, 5 Drawing Sheets

(52) U.S. Cl.
CPC ..... *F02D 13/0265* (2013.01); *F02D 41/0007* (2013.01); *F02B 2037/122* (2013.01); *F02B 2037/125* (2013.01); *F02D 2041/001* (2013.01); *Y02T 10/12* (2013.01)

(58) Field of Classification Search
CPC ............... F02D 2041/001; F02B 37/12; F02B 2037/122; F02B 2037/125
See application file for complete search history.

(56) References Cited

U.S. PATENT DOCUMENTS

| | | | |
|---|---|---|---|
| 11,686,259 B2* | 6/2023 | Dahl | F02D 13/0219 |
| | | | 123/311 |
| 2006/0174854 A1 | 8/2006 | Yoshizawa | |
| 2008/0283025 A1 | 11/2008 | Sato | |
| 2009/0013945 A1 | 1/2009 | Buckland et al. | |
| 2009/0018751 A1* | 1/2009 | Buckland | F02B 37/18 |
| | | | 123/90.15 |
| 2009/0151678 A1 | 6/2009 | Park et al. | |
| 2015/0354482 A1* | 12/2015 | Leone | F02D 41/0065 |
| | | | 123/568.21 |
| 2017/0234210 A1 | 8/2017 | Ohisa et al. | |

FOREIGN PATENT DOCUMENTS

| | | |
|---|---|---|
| EP | 2347110 A1 | 7/2011 |
| JP | 2011149312 A | 8/2011 |
| JP | 2018189060 A | 11/2018 |
| WO | 2008149316 A2 | 12/2008 |
| WO | 2010058082 A1 | 5/2010 |
| WO | 2011004091 A1 | 1/2011 |
| WO | 2017217908 A1 | 12/2017 |

OTHER PUBLICATIONS

Scania CV AB, International Patent Application No. PCT/SE2021/051106, International Search Report, Dec. 23, 2021.
Scania CV AB, International Patent Application No. PCT/SE2021/051106, Written Opinion, Dec. 23, 2021.
Scania CV AB, Swedish Patent Application No. 2051445-1, Office Action, Jun. 1, 2021.
Scania CV AB, Swedish Patent Application No. 2051445-1, Office Action, Dec. 27, 2021.
Scania CV AB, European Patent Application No. 21903955.9, Extended European Search Report, Oct. 2, 2024.

* cited by examiner

| n_corr | m'_corr, m'_corr_surge | Pout : Pin |
|---|---|---|
| rpm | kg/s | |
| 45365 | 0,046 | 1,388 |
| 61144 | 0,108 | 1,816 |
| 72978 | 0,150 | 2,202 |
| 82840 | 0,201 | 2,592 |
| 90730 | 0,238 | 3,040 |
| 96647 | 0,283 | 3,398 |
| 102564 | 0,346 | 3,785 |
| 110454 | 0,368 | 4,318 |

CONTROLLING VALVE ACTUATION OF AN INTERNAL COMBUSTION ENGINE TO PREVENT COMPRESSOR SURGE

CROSS-REFERENCE TO RELATED APPLICATIONS

This application is a National Stage Patent Application (filed under 35 § U.S.C. 371) of PCT/SE2021/051106, filed Nov. 5, 2021, of the same title, which, in turn claims priority to Swedish Patent Application No. 2051445-1 filed Dec. 11, 2020, of the same title; the contents of each of which are hereby incorporated by reference.

TECHNICAL FIELD

The invention relates to a method for controlling valve actuation and a control arrangement for controlling valve actuation. The invention further relates to an internal combustion engine and to a vehicle comprising an internal combustion engine. Moreover, the invention relates to a computer program and a computer-readable storage medium.

BACKGROUND

A modern internal combustion engine, ICE, often comprises one or more compressors arranged to provide compressed air to be charged into the combustion chamber/s of the ICE. Often reference is made to "charge air", which is provided by the compressor. A compressor comprises an impeller which can be driven; by exhaust gas of the ICE in a turbine of a so-called turbocharger; by the crankshaft of the ICE, e.g. via a drive belt; or by an electric motor.

A compressor has undesirable and/or unstable operating regions. These can be noticeable as noise phenomena and/or by erratic ICE behavior. Compressor surge is a problem related to the unstable operating region of a compressor, which affects the ICE and its operation negatively. Compressor surge, also referred to simply as surge, is an instability in the airflow from the compressor to the intake valve/s of the ICE. During surge, the mass flow of air varies periodically. During so-called "deep surge" or "full surge", the mass flow of air may even flow towards the compressor, i.e. in reverse to the intended flow direction. Surge can damage and even destroy a compressor.

A compressor map can be shown as a diagram presented with corrected or reduced mass flow and pressure ratio of the compressor on the x- and y-axes, respectively. Corrected or reduced compressor constant speed lines are shown in the diagram and a so-called surge line indicates the stable operating range of the compressor. When the mass flow rate drops along a compressor constant speed line, compressor surge will commence at a critical mass flow value. The surge line is commonly established by interconnecting the critical mass flow values for a number of compressor speed lines. A compressor map is usually established by performing measurements on the compressor being run in a test rig but can alternatively be established by measurements on the compressor on an engine installation.

Surge in a compressor of an ICE should be avoided since it may damage the compressor and other parts of the ICE.

JP 2018/189060 discloses an engine control system comprising: variable valve timing mechanisms; a supercharger; state quantity acquisition units configured to acquire suctioned air state quantity of an engine; a determination unit configured to determine whether the suctioned air state quantity is within a predetermined surge region where a surge phenomenon may occur in the supercharger; and a control unit. The control unit is configured to, when it is determined that the suctioned air state quantity is within the predetermined surge region, control the variable valve timing mechanisms to prevent a surge phenomenon of the supercharger.

SUMMARY

It would be advantageous to reduce risk of operating a compressor of an ICE in unstable or undesirable operating regions. In particular, it would be desirable to provide valve actuation in an ICE while avoiding operating a compressor of the ICE in unstable or undesirable regions thus, at least reducing the risk of surge in the compressor. To better address one or more of these concerns, at least one of a method for controlling valve actuation and an arrangement for controlling valve actuation having the features defined in the independent claims is provided.

According to an aspect, there is provided a method for controlling valve actuation of an internal combustion engine, ICE. The ICE comprises an exhaust valve, an intake valve, and a turbo compressor. The method comprises:
  limiting valve actuation changes of the exhaust and intake valves based on compressor data including surge limit data for the turbo compressor and one or both of a current turbo compressor rotational speed and a current turbo compressor pressure ratio, to maintain a turbo compressor mass flow above a limit mass flow value.

According to a further aspect, there is provided a control arrangement for controlling valve actuation of an internal combustion engine, ICE. The ICE comprises an exhaust valve, an intake valve, and a turbo compressor. The control arrangement is configured to:
  limit valve actuation changes of the exhaust and intake valves based on compressor data including surge limit data for the turbo compressor and one or both of a current turbo a compressor rotational speed and current turbo compressor pressure ratio, to maintain a turbo compressor mass flow above a limit mass flow value.

Since the valve actuation changes of the exhaust and intake valves are limited based on the compressor data including surge limit data for the turbo compressor and one or both of the current turbo compressor rotational speed and the current turbo compressor pressure ratio, to maintain the turbo compressor mass flow above the limit mass flow value, operation of the compressor in unstable or undesirable operating regions of the compressor is avoided or at least avoided to a substantial degree.

More specifically, valve actuation changes of the exhaust and intake valves can under certain ICE operating conditions cause unstable or undesirable operation of the compressor. By limiting valve actuation changes, actuation changes that at final positions of valve actuation changes, or earlier during the valve actuation changes, could lead to unstable or undesirable operation of the compressor are prevented from reaching the final positions in a manner that would otherwise cause unstable or undesirable operation of the compressor, such as surge and/or noise phenomena.

It has been realized by the inventors that by utilising stored compressor data, and at least one current compressor operating parameter, situations where unstable or undesirable operation of the compressor would occur can be avoided by limiting the valve actuation changes of the exhaust and intake valves.

Accordingly, limiting/limit valve actuation changes means that valve actuation changes towards target actuation settings of the exhaust and intake valves that are calculated e.g. in an engine control unit, ECU, are not executed in accordance with the calculations in the ECU but are instead limited. The ECU typically determines target actuation settings for valve actuation changes of the exhaust and intake valves in order to tune operation of the ICE. For instance, the target actuation settings may maintain the exhaust gas temperature of the ICE above a minimum temperature threshold, may reduce fuel consumption of the ICE, or may influence compression release braking of the ICE.

The target actuation settings are not specifically set with regard to the compressor operation and in particular are not determined for avoiding unstable or undesirable compressor operation. Instead, according to the method and/or the control arrangement of the present invention such measures are taken by the limiting of valve actuation changes. Thus, the ECU may provide basic control of ICE operation while one characteristic of the present invention is to intervene only when so is necessary for avoiding unstable or undesirable compressor operation.

One and the same engine block and cylinders are often provided in several different ICE configurations in different powertrains and different vehicles, with different power specifications, with different types and numbers of turbo compressors, provided with different transmission types, with differing numbers of driven wheels, with different dimensions and volumes of charge air conduits including differently sized charge air coolers, and with further flow paths beside the compressor mass flow and the engine intake mass flow, such as e.g. EGR, exhaust gas recirculation. Thus, basic ICE operation may be provided by the ECU for a number of different ICE configurations while the method and control arrangement of the present invention adapt valve actuation of the ICE for the particular turbo compressor/s teamed with the ICE in a particular powertrain.

"Limiting valve actuation changes" and to "limit valve actuation changes" may be achieved by reducing the actual final positions reached by the valve actuation changes, and/or by increasing the time period utilized for the valve actuation changes to reach the final positions. In practice, also the former, may in some ICE operating situations mean that valve actuation changes that would lead to final positions with operation of the compressor in unstable or undesirable operating regions, if performed directly, may be divided into a number of partial valve actuation changes over time to eventually reach the initially intended final positions of the valve actuation changes.

The limit mass flow value is set such that the risk of unstable and/or undesirable operation of the compressor is reduced, and preferably avoided.

Maintaining the turbo compressor mass flow above the limit mass flow value entails that a stable operation of the turbo compressor may be achieved.

The limit mass flow value may be a surge limit mass flow at current compressor operating conditions, as provided by the surge limit data. Alternatively, the limit mass flow value may be provided with a margin to the surge limit mass flow to ensure stable operation of the compressor under all or at least most ICE operating conditions.

The turbo compressor may form part of a turbocharger, which accordingly, comprises a turbine which is driven by the exhaust gas of the ICE. The turbine drives an impeller of the turbo compressor. Alternatively, the impeller of the turbo compressor may be driven by a crankshaft of the ICE, e.g. via a drive belt, or the impeller may be driven by an electric motor. Herein, the turbo compressor may alternatively be referred to as compressor. Herein, reference may be made to compressor rotational speed which accordingly, refers to the rotational speed of the impeller of the compressor.

The ICE may comprise more than one turbo compressor, such as two, four, six, or eight turbo compressors, or e.g. one turbo compressor for each cylinder or for each pair of cylinders of the ICE. One or more compressors may be arranged to charge separate banks of cylinders of the relevant ICE. Compressors may be connected in series and/or arranged in parallel. The present method and control arrangement configuration for controlling vale actuation may be applied to each compressor of an ICE comprising multiple compressors in order to avoid unstable or undesirable operating regions of each one of the compressors.

The internal combustion engine, ICE may be a four-stroke or two-stroke compression ignition ICE, such as a diesel engine, alternatively, the ICE may be an Otto engine. In a four-stroke ICE, each piston performs over two revolutions of the crankshaft an intake stroke, a compression stroke, a power or expansion stroke, and an exhaust stroke. In a two-stroke ICE each piston performs a compression stroke and an expansion stroke for each revolution of the crankshaft.

The ICE comprises at least one cylinder, such as e.g. four, five, six, or eight cylinders. Alternatively, the ICE may comprise more than eight cylinders, such as e.g. in larger ICE:s used aboard ships.

Herein, the term "valve actuation changes" relates to that the opening and closing of the exhaust and intake valves in relation to the rotational position of the crankshaft of the ICE. Valve actuation changes encompass pure timing changes of opening and closing positions of the exhaust and intake valves with maintained open period duration for each valve as well as lift height changes of the exhaust and intake valves and combinations of the two. Timing changes and lift height changes of the exhaust and intake valves affect the amount of air admitted into the cylinders of the ICE and the amount of gas passing through the cylinders reaching a downstream exhaust system.

The compressor data may be provided in the form of one or more of a compressor map of the relevant turbo compressor of the ICE, a compressor table containing compressor data of the relevant turbo compressor of the ICE, a mathematical model of the relevant turbo compressor of the ICE, etc.

In order to perform valve actuation changes, the ICE comprises a suitable mechanism. Such mechanisms are known. For instance, the timing of the exhaust and intake camshafts being controllable entails that the rotational position of camshafts of the ICE in relation to the crankshaft is changed and accordingly, also the opening and closing of the exhaust and intake valves. This may also be referred to as cam phasing. For instance, WO 2017/217908 and US 8714123 disclose timing control arrangements to be utilized for changing the timing of the camshafts. A different approach is to use so-called variable valve lift, VVL, which provides for changes in how much the exhaust and intake valves are permitted to open, i.e. changes in the lift height of the valves. US 2009/0151678 discloses a VVL mechanism. A combination of cam phasing and VVL may be referred to as variable valve actuation, VVA. For instance, US 2006/0174854 disclose such a VVA mechanism. However, there are other ways of achieving VVA, such as by the mechanism disclosed in WO 2008/149316, which is provided in an ICE without any camshafts, or with electromechanically actuated valves such as provided by the company Freevalve of Ängelholm, Sweden. In its broadest aspects, the present invention is not limit to any particular type of mechanism for achieving valve actuation changes.

Herein, reference will be made to crankshaft angle degrees, CA degrees, when discussing timing changes of the camshafts. One full rotation of the crankshaft is 360 CA degrees. In a four-stroke ICE crankshaft angle may be measured e.g. in relation to Top Dead Center fire, TDCfire, or Top Dead Center gas exchange, TDCge.

If the cylinder arrangement comprises one or more additional intake valves and/or exhaust valves, also these valves may be controlled with limited valve actuation changes in the manner discussed above. On the other hand, e.g. in an ICE comprising a compression release braking, CRB, arrangement wherein only one of e.g. two exhaust valves is actuated during CRB, only that valve may be controlled with limited valve actuation changes in the manner discussed above.

According to embodiments, the method may further comprise:
  determining target actuation settings of the exhaust and intake valves, and
  initiating valve actuation changes of the exhaust and intake valves towards the target actuation setting of the exhaust and intake valves, and wherein the step of limiting the valve actuation changes may comprise:
  preventing the initiated valve actuation changes from reaching the target actuation settings of the exhaust and intake valves, or
  increasing a time period required for the valve actuation changes to reach the target actuation settings of the exhaust and intake valves. In this manner, unstable or undesirable operation of the turbo compressor may be avoided by any of the steps of preventing or increasing. More specifically, the limiting may be achieved in relation to target actuation settings of the exhaust and intake valves and the step of limiting valve actuation changes may be further defined in relation to these target actuation settings.

According to embodiments, the method, may further comprise:
  determining a target ICE mass flow at the target actuation settings of the exhaust and intake valves, and
  comparing the target ICE mass flow with the limit mass flow value, and wherein if the target ICE mass flow reaches the limit mass flow value, then perform the step of:
  limiting the valve actuation changes of the exhaust and intake valves.

In this manner, unstable or undesirable operation of the turbo compressor may be avoided since the step of limiting prevents the target ICE mass flow from being reached, a mass flow rate which otherwise could cause unstable or undesirable operation of the turbo compressor.

It has been realized by the inventors that by utilizing stored compressor data, such as limit mass flow values and by calculating the mass flow of air passing through the ICE at the target actuation settings of the exhaust and intake valves, and comparing them, situations where unstable or undesirable operation of the compressor would occur can be avoided by limiting the valve actuation changes of the exhaust and intake valves.

According to embodiments, the limit mass flow value may be based on the surge limit data and the method may comprise:

adapting the limit mass flow value to a current ICE operating condition. In this manner, further consideration may be taken to the current operating conditions of the ICE and the mass flow through the ICE during such operating conditions when the step of limiting valve actuation changes of the exhaust and intake valves based on the surge limit data is performed.

According to a further aspect there is provided a four-stroke internal combustion engine comprising a control arrangement according to any one of aspects and/or embodiments discussed herein.

According to a further aspect there is provided a vehicle comprising a four-stroke internal combustion engine according to any one of aspects and/or embodiments discussed herein.

According to a further aspect there is provided a computer program comprising instructions which, when the program is executed by a computer, cause the computer to carry out the method according to any one of aspects and/or embodiments discussed herein.

According to a further aspect there is provided a computer-readable storage medium comprising instructions which, when executed by a computer, cause the computer to carry out the method according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
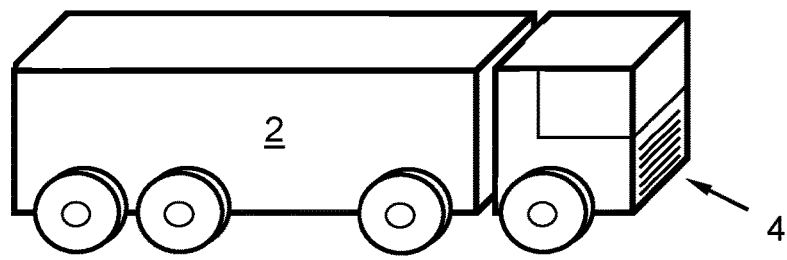
FIG. 1 illustrates embodiments of a vehicle,
  FIG. 2 schematically illustrates embodiments of an ICE.

FIG. 1 illustrates embodiments of a vehicle 2 configured for land-based propulsion. The vehicle 2 comprises a four-stroke internal combustion engine, ICE, 4 according to aspects and/or embodiments discussed herein, such as e.g. the ICE discussed below with reference to FIG. 2. The ICE 4 comprises a control arrangement, as discussed below with reference to FIGS. 2 and 3.

In these embodiments, the vehicle 2 is a heavy duty vehicle in the form of a truck. However, the invention is not limited to any particular type of vehicle configured for land-based propulsion.

Figure 2:
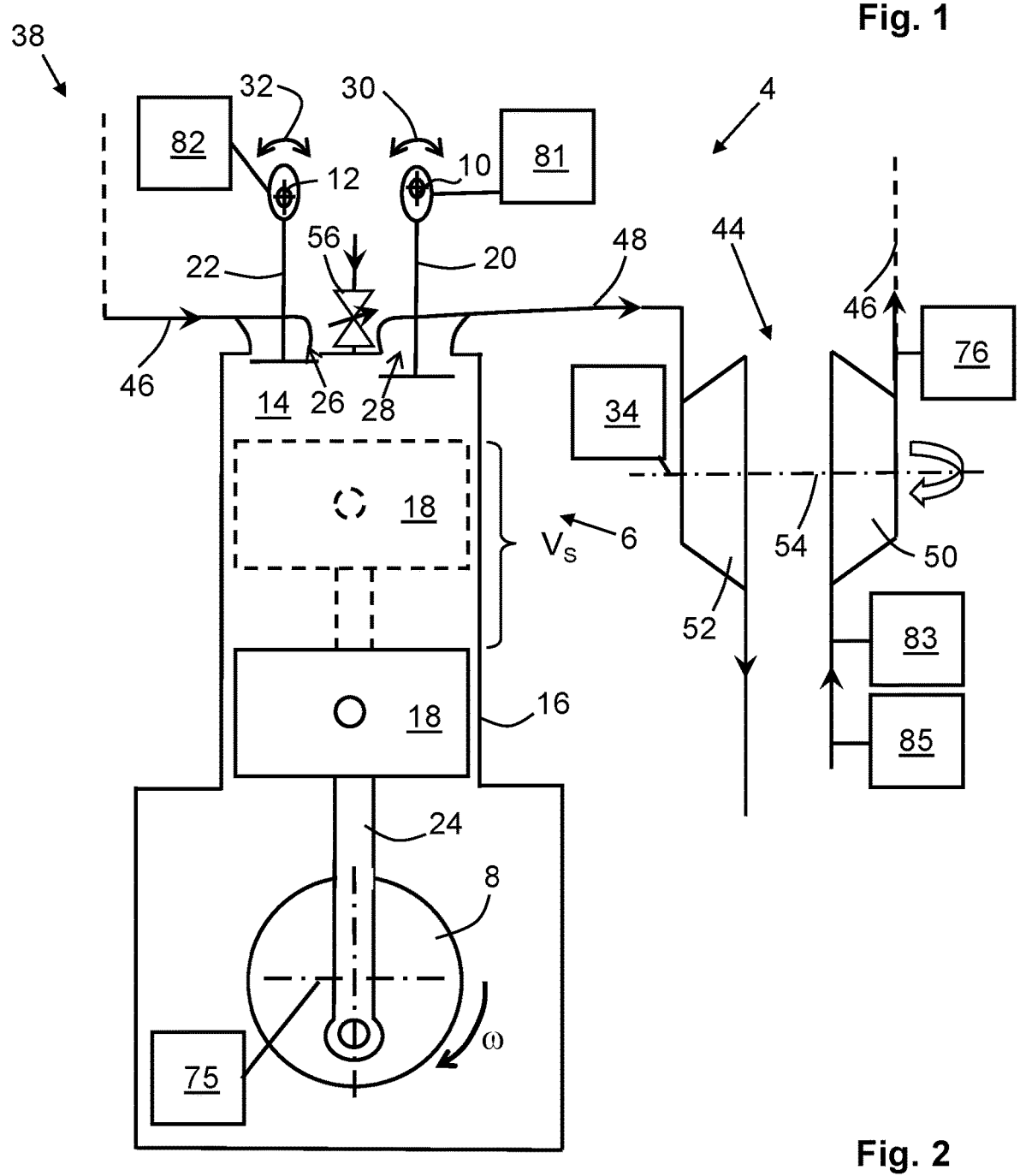
Figure 7:
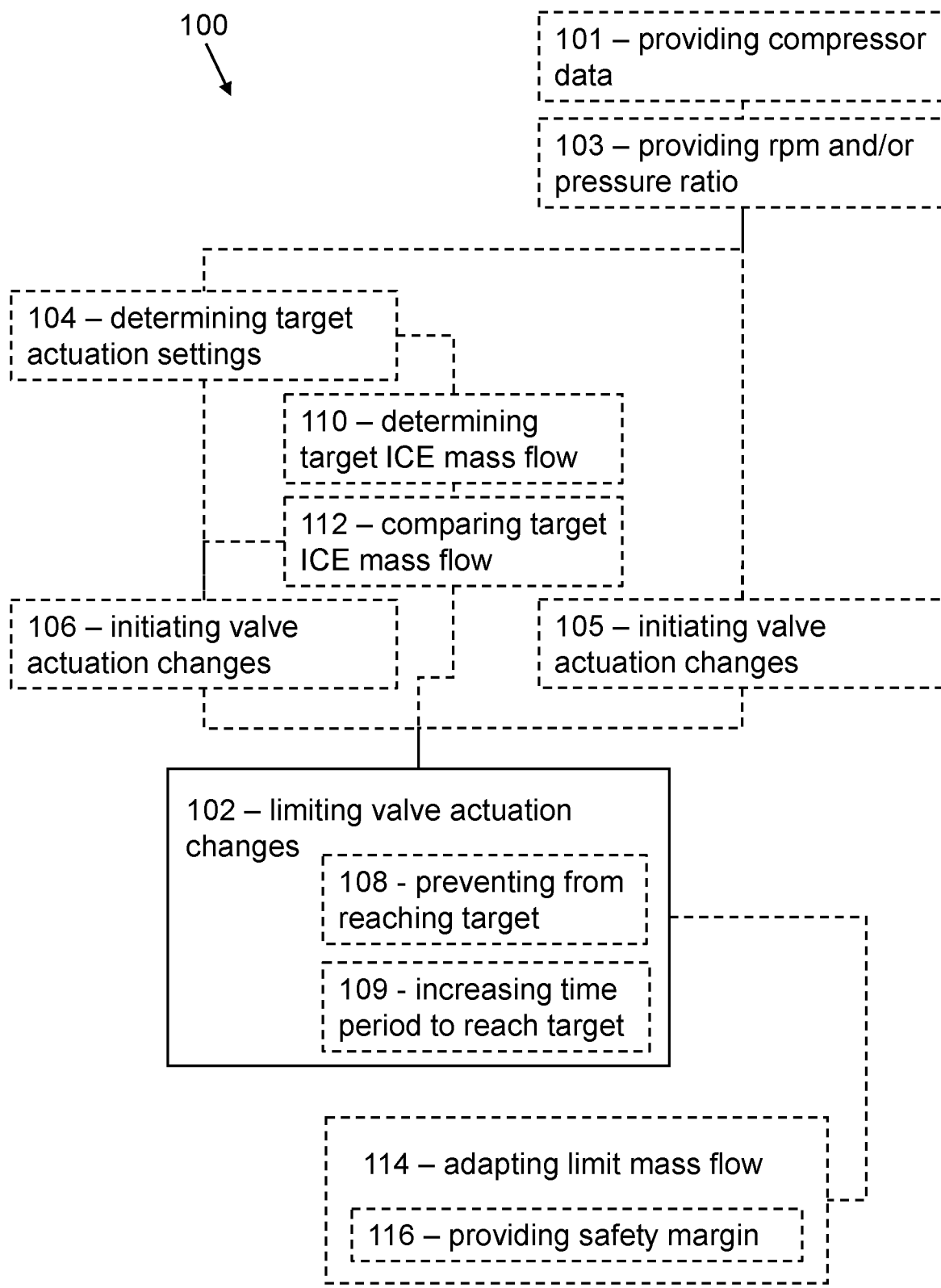
FIG. 7 illustrates embodiments of a method for controlling valve actuation.

FIG. 2 schematically illustrates embodiments of a four-stroke ICE 4. The ICE 4 may be configured to form part of a powertrain of a vehicle, such as e.g. the vehicle 2 shown in FIG. 1. The method discussed herein, inter alia with reference to FIG. 7, is applicable in the ICE 4. However, the method may alternatively be applicable in a two-stroke ICE, such as a large two-stroke ICE used for propelling a ship.

The four-stroke ICE 4 is a direct injection internal combustion engine, such as a compression ignition ICE 4, e.g. a diesel engine. The ICE 4 comprises at least one cylinder arrangement 6, commonly simply referred to as a cylinder, and a crankshaft 8.

The cylinder arrangement 6 comprises a combustion chamber 14, a cylinder bore 16, a piston 18 configured to reciprocate in the cylinder bore 16, an exhaust valve 20, and an intake valve 22. The piston 18 is connected to the crankshaft 8 via a connecting rod 24.

The intake valve 22 is configured for admitting charge air into the combustion chamber 14, and the exhaust valve 20 is configured for letting exhaust gas out of the combustion chamber 14. In a known manner, the intake valve 22 comprises an intake valve head configured to seal against an intake valve seat extending around an intake opening 26. The exhaust valve comprises an exhaust valve head configured to seal against an exhaust valve seat extending around an exhaust opening 28.

The ICE 4 further comprises a mechanism for controlling the movement of the exhaust and intake valves 20, 22.

In these embodiments the mechanism comprises an exhaust camshaft 10, and an intake camshaft 12. The movement of the exhaust valve 20 is controlled by the exhaust camshaft 10, i.e. the exhaust camshaft 10 is configured to control the opening and closing of the exhaust valve 20. The movement of the intake valve 22 is controlled by the intake camshaft 12, i.e. the intake camshaft 12 is configured to control the opening and closing of the intake valve 22.

However, other mechanical, hydraulic, or electromechanical mechanisms, or combinations thereof may alternatively be utilized for controlling the movement of the exhaust and intake valves 20, 22.

In particular, the mechanism for controlling the movement of the exhaust and intake valves 20, 22 provides for valve actuation changes, i.e. that the opening and closing of the valves 20, 22 in relation to the rotational position of the crankshaft 8 can be changed. For instance, the mechanism may be any one of the prior art mechanisms referred to above in the Summary portion of the description.

Accordingly, to provide for valve actuation changes in these embodiments, the timing of the exhaust camshaft 10 is configured to be controlled by a timing control arrangement 30 as indicated by a double arrow. Similarly, the timing of the intake camshaft 12 is configured to the be controlled by a timing control arrangement 32 as indicated by a double arrow.

The piston 18 is arranged to reciprocate in the cylinder bore 16. The piston 18 performs four strokes in the cylinder bore 16, corresponding to an intake stroke, a compression stroke, an expansion or power stroke, and an exhaust stroke, see also FIG. 5. In FIG. 2 the piston 18 is illustrated with continuous lines at its Bottom Dead Center, BDC, and with dashed lines at its Top Dead Center, TDC. The combustion chamber 14 is formed above the piston 18 inside the cylinder bore 16.

The cylinder arrangement 6 has a total swept volume, Vs, in the cylinder bore 16 between the BDC and the TDC. According to some embodiments, the cylinder arrangement 6 may have a total swept volume, Vs, of within a range of 0.3 to 4 liters. Mentioned purely as an example, in the lower range of Vs, the cylinder arrangement 6 may form part of an internal combustion engine for a passenger car, and in the middle and higher range of Vs, the cylinder arrangement 6 may form part of an internal combustion engine for a heavy duty vehicle such as e.g. a truck, a bus, or a construction vehicle.

The ICE 4 comprises a turbo compressor 50. In these embodiments, the turbo compressor forms part of a turbocharger 44. The turbocharger 44 comprises the turbo compressor 50 and a turbine 52. The turbo compressor 50 and the turbine 52 of the turbocharger 44 are connected via a common shaft 54. An inlet conduit 46 for charge air, leads from an outlet of the turbo compressor 50 to the intake opening 26 of the cylinder arrangement 6. For the sake of clarity, the inlet conduit 46 is not shown in its entirety. A charge air cooler (not shown) may be arranged in, or form part of, the inlet conduit 46. An exhaust conduit 48 leads from the exhaust opening 28 of the cylinder arrangement 6 to the turbine 52. The turbo compressor 50 produces a charge air pressure in the inlet conduit 46 and at the intake valve 22. More specifically, the gas discharged via the exhaust valve 20 drives the turbine 52, which in turn rotates an impeller of the turbo compressor 50. Thus, the turbo compressor 50 provides charge air at a charge air pressure to the intake valve 22.

According to alternative embodiments, the turbo compressor 50 may be driven in a different manner than by the exhaust gas via the turbine 52, such as by the crankshaft 8 or by a separate electric motor.

The ICE 4 comprises a fuel injector 56 configured for injecting fuel into the combustion chamber 14 when the ICE 4 produces positive torque, e.g. for propelling the vehicle.

The ICE 4 further comprises a control arrangement 38 according to aspects and/or embodiments discussed herein. The control arrangement 38 is configured for controlling valve actuation changes of the ICE 4. That is, in these embodiments, the control arrangement 38 is configured for controlling at least the timing of the exhaust camshaft 10 and the timing of the intake camshaft 12. Accordingly, the timing control arrangements 30, 32 form part of the control arrangement 38.

According to alternative embodiments, comprising other or further mechanisms for controlling valve actuation changes than the timing controlled exhaust and intake camshafts 10, 12, a corresponding control arrangement 38 for achieving valve actuation changes is provided.

Irrespective of the mechanism for controlling valve actuation changes, the control arrangement 38 is configured to:
limit valve actuation changes of the exhaust and intake valves 20, 22 based on compressor data including surge limit data for the turbo compressor 50 and one or both of the current turbo compressor rotational speed and current turbo compressor pressure ratio, to maintain a turbo compressor mass flow above a limit mass flow value.

In this manner operation of the turbo compressor 50 in unstable or undesirable operating regions of the turbo compressor 50 is avoided or at least avoided to a substantial degree.

According to some embodiments, the limiting of valve actuation changes of the exhaust and intake valves 20, 22 may be achieved by the control arrangement 38 being configured to perform one or more of:
proving the compressor data including surge limit data for the turbo compressor 50, which compressor data may be stored in a memory of the control arrangement 38,
providing current turbo compressor 50 rotational speed and/or current compressor pressure ratio, as measured by sensors of the control arrangement 38 and calculated where applicable in a calculation unit of the control arrangement 38, such as a rotational speed sensor 34 of the compressor 50 and pressure sensors 83, 76 at inlet and outlet sides of the compressor 50, and limiting timing changes of the exhaust and intake camshafts 10, 12 based on compressor data including surge limit data for the turbo compressor 50 and one or both of the current turbo compressor rotational speed and current turbo compressor pressure ratio, to maintain a turbo compressor mass flow above a limit mass flow value.

According to some embodiments, the control arrangement 38 may be further configured to:

determine target actuation settings of the exhaust and intake valves 20, 22, initiate valve actuation changes of the exhaust and intake valves 20, 22 towards the target actuation settings of the exhaust and intake valves 20, 22, and either prevent the initiated valve actuation changes from reaching the target actuation settings of the exhaust and intake valves 20, 22, or increase a time period required for the valve actuation changes to reach the target actuation settings of the exhaust and intake valves 20, 22.

In this manner, unstable or undesirable operation of the turbo compressor 50 may be avoided by either the preventing of the initiated valve actuation changes from reaching the target actuation settings or from reaching the target actuation settings directly, e.g. by increasing of the time period required for the valve actuation changes to reach the target actuation settings.

According to some embodiments, this may be achieved by the control arrangement 38 being configured to perform one or more of:

determine target timing settings of the exhaust and intake camshafts 10, 12, initiate timing changes of the exhaust and intake camshafts 10, 12 towards the target timing settings of the exhaust and intake camshafts 10, 12, prevent the initiated timing changes from reaching the target timing settings, and increase a time period required for the initiated timing changes to reach the target timing settings of the exhaust and intake camshafts 10, 12.

According to some embodiments, the control arrangement 38 may be further configured to:

determine a target ICE mass flow at the target actuation settings, and compare the target ICE mass flow with the limit mass flow value, and wherein if the target ICE mass flow reaches the limit mass flow value, the control arrangement 38 may be configured to:

limit the valve actuation changes of the exhaust and intake valves 20, 22.

In this manner, unstable or undesirable operation of the turbo compressor 50 may be avoided since the limiting prevents the target ICE mass flow from being reached, a mass flow rate which otherwise could cause unstable or undesirable operation of the turbo compressor.

According to some embodiments, this may be achieved by the control arrangement 38 being configured to perform one or more of:

determining a target ICE mass flow at the target timing settings of the exhaust and intake camshafts 10, 12, and limit the initiated timing changes of the exhaust and intake camshafts 10, 12.

According to embodiments, the limit mass flow value may be based on the surge limit data and the control arrangement 38 may be configured to:

adapt the limit mass flow value to a current ICE operating condition. Further reference is made to the corresponding feature of the method discussed herein.

According to embodiments, in the context of the adapting of the limit mass flow to the current ICE operating condition, the control arrangement 38 may be configured to:

provide a larger safety margin to the surge limit data when the degree of change of ICE operation is an abrupt reduction of a torque request to the ICE, than when the degree of ICE operation is a gradual change in torque request to the ICE. Further reference is made to the corresponding feature of the method discussed herein.

A torque request is an instruction, typically from an ECU of the ICE 4, to provide a particular torque. A torque request may be initiated by an accelerator pedal setting or by a cruise control of a vehicle.

The control arrangement 38 and the valve actuation changes of the exhaust and intake valves, 20, 22 are further discussed below with reference to FIGS. 3-6.

The ICE 4 may comprise any suitable or common number of cylinder arrangements 6, such as e.g. four, five, six, or eight cylinder arrangements.

Figure 3:
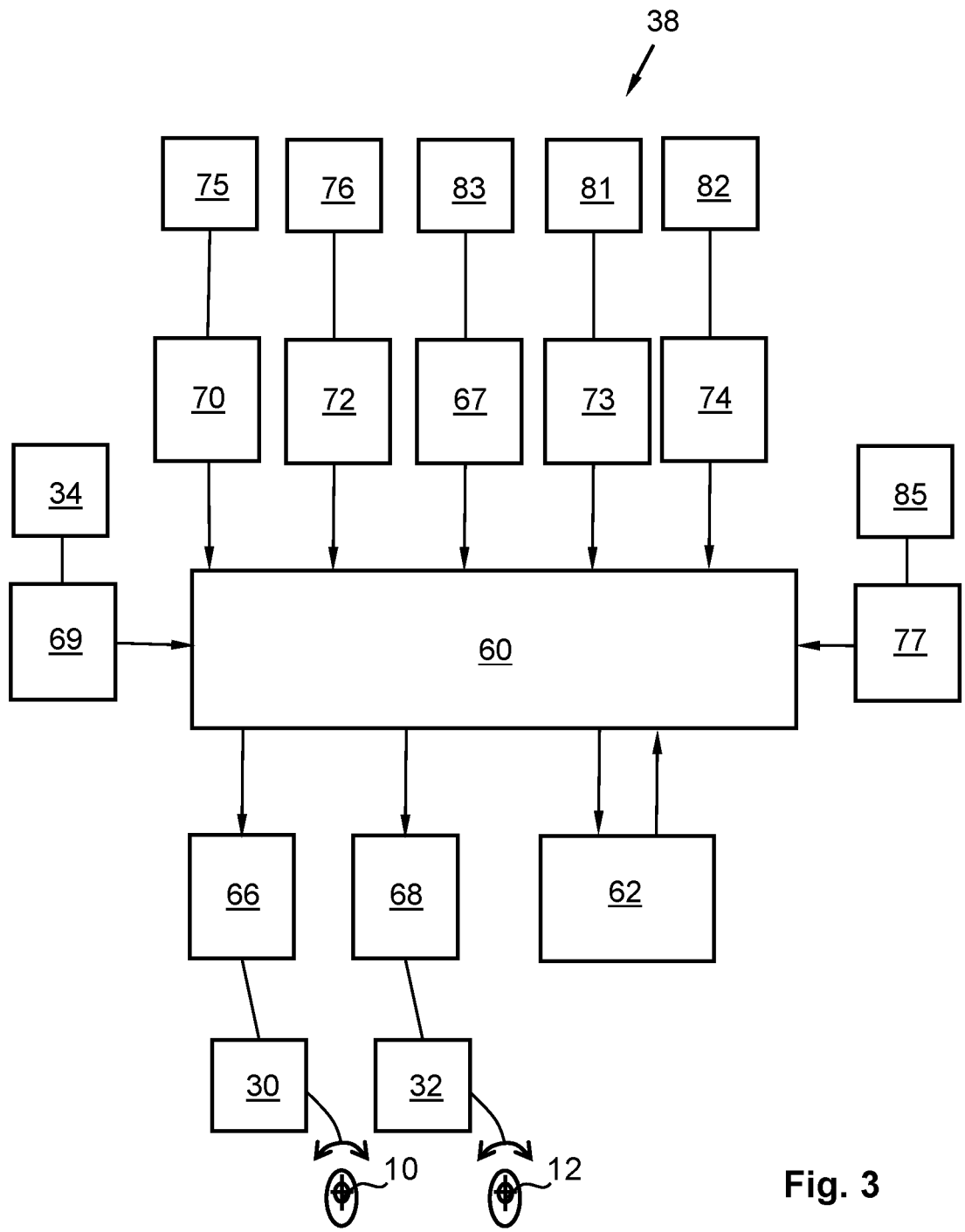
FIG. 3 illustrates a control arrangement.

FIG. 3 illustrates a control arrangement 38 to be utilized in connection with different aspects and/or embodiments of the invention. In particular, the control arrangement 38 is configured for the control of valve actuation changes discussed herein. The control arrangement 38 is also indicated in FIG. 2. Accordingly, in the following reference is also made to FIG. 2.

The control arrangement 38 comprises at least one calculation unit 60, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as, e.g., any, some or all of the ones mentioned above. The calculation unit 60 may be configured to perform calculations, such as e.g. interpolations and mathematical calculations as discussed herein.

The control arrangement 38 comprises a memory unit 62. The calculation unit 60 is connected to the memory unit 62, which provides the calculation unit 60 with, e.g. stored program code, data tables, and/or other stored data e.g. related to the turbo compressor 50, which the calculation unit 60 needs to enable it to do calculations and to control the valve actuation changes. The calculation unit 60 is also adapted to store partial or final results of calculations in the memory unit 62. The memory unit 62 may comprise a physical device utilized to store data or programs, i.e. sequences of instructions on a temporary or permanent basis. According to some embodiments, the memory unit 62 may comprise integrated circuits comprising silicon-based transistors. The memory unit 62 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 38 is further provided with respective devices 66, 67, 68, 69, 70, 72, 73, 74, 77 for receiving and/or sending input and output signals. These input and output signals may comprise waveforms, pulses or other attributes, which can be detect as information by signal receiving devices, and which can be converted to signals processable by the calculation unit 60. Input signals are supplied to the calculation unit 60 from the input receiving devices 67, 69, 70, 72, 73, 74, 77. Output signal sending devices 66, 68, are arranged to convert calculation results from the calculation unit 60 to output signals for conveying to signal receiving devices of other parts of the control arrangement 38. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, only one calculation unit 60 and memory unit 62 are shown, but the control arrangement 38 may alternatively comprise more than one calculation unit and/or memory unit.

Mentioned as examples, in the depicted embodiments, the output signal sending devices 66, 68, may send control signals to the timing control arrangements 30, 32 of the exhaust and intake camshafts 10, 12. The input signal receiving devices 67, 69, 70, 72, 73, 74, 77 may receive signals from the ICE 4, such as e.g. from a rotational speed sensor 34 of the turbo compressor 50, a rotational speed/position sensor 75 of the crankshaft 8 of the ICE 4, a compressor outlet/charge air pressure sensor 76, a rotational speed/position sensor 81 of the exhaust camshaft 10, a rotational speed/position sensor 82 of the intake camshaft 12, compressor inlet pressure sensor 83, and compressor inlet temperature sensor 85.

Examples of data tables may be e.g. a compressor table, a table showing relationships between turbocharger rotational speed and charge air pressure, a table containing fuel injection quantities, etc. A further example of a data table may be a compressor map related to the compressor 50.

Examples of data may be measured, monitored, determined, and/or calculated data, such as rotational speed data, charge air pressure data, timing change angle data, valve actuation change data, surge limit data such as surge mass flow data, limit mass flow data, compressor inlet pressure, compressor inlet temperature, etc. The control arrangement 38 comprises or is connected to various sensors and actuators in order to receive input and provide output for performing the various aspects and embodiments of the method and functions of the control arrangement 38 discussed herein. Some of the various sensors are exemplified above. An example of actuators may be actuators configured for changing valve actuation such as actuators for the changing of the timing of the camshafts 10, 12 forming part of the timing control arrangements 30, 32.

The control arrangement 38 may be configured to perform a method 100 according to any one of aspects and/or embodiments discussed herein, see e.g. below with reference to FIG. 7. Accordingly, discussions related to the method 100 are applicable to corresponding features of the control arrangement 38 and vice versa.

The calculation unit 60 may comprise one separate processor or it may take the form of a distributed calculation unit 60, i.e. comprising more than one processor. Similarly, the calculation unit 60 may be dedicated for executing the herein discussed method and functionality or the calculation unit 60 may be configured to perform further tasks, such as e.g. forming an engine control unit, ECU, of the ICE 4. In the latter case, the herein discussed method and functionality may be programmed as separate entities of the ECU and may be programmed to limit, override, interrupt, or intervene with other ICE controlling operation of the ECU, such as e.g. intended valve actuation changes, initiated valve actuation changes towards target actuation settings, and initiated timing changes of the camshafts 10, 12.

The control arrangement 38 is configured to store a representation of the turbo compressor such as a compressor map, a data table containing compressor data of the turbo compressor 50, and/or a model of the turbo compressor 50.

Figure 4:
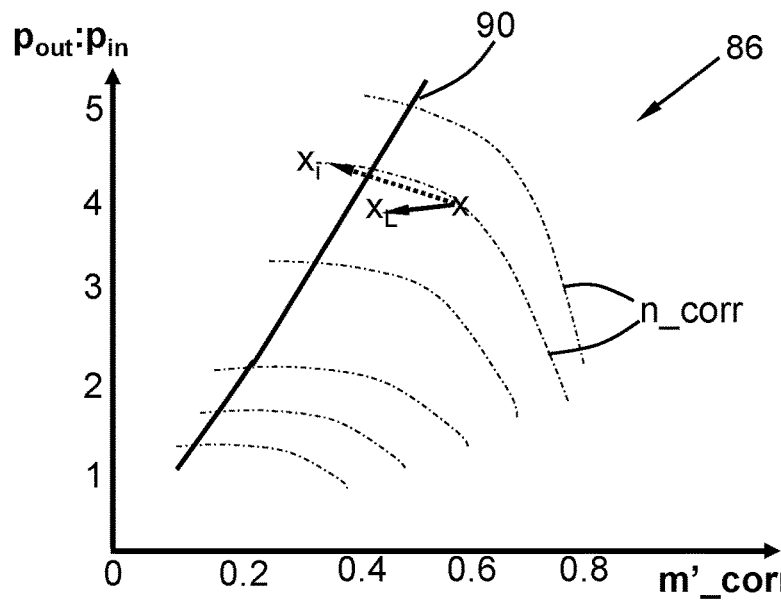
FIG. 4 illustrates an example of a compressor map.

FIG. 4 illustrates an example of a compressor map 86 of a typical compressor 50 forming part of an ICE 4 for a vehicle. A compressor map is a commonly known diagram showing the operational range of a turbo compressor. The compressor map 86 may be defined as a field in a coordinate system having axes expressing charge air mass flow, m', and compressor pressure ratio, i.e. the relationship between the charge air pressure after and before the turbo compressor, P_out:P_in. Commonly, the mass flow is a corrected mass flow, m'_corr, or a reduced mass flow, m'_red. Also, in the diagram constant speed lines for the compressor are shown, i.e. of an impeller of the turbo compressor, such as corrected constant speed lines, n_corr, or reduced constant speed lines, n_red. A number of constant speed lines are shown in the diagram as dash-dotted lines marked "n_corr". A surge line 90 indicates the stable operating range of the turbo compressor. That is, the surge line 90 indicates corrected surge limit mass flow, m'_corr_surge, for different pressure ratios.

On the X-axis corrected mass flow, m'_corr, is presented. The corrected mass flow, m'corr, is the mass flow, m', through the compressor 50 corrected as represented at a standard temperature and a standard pressure with a reference temperature, T_ref, and a reference pressure, P_ref, e.g. T_ref=298K and P_ref=100000 Pa. T_in is the actual air temperature at the compressor inlet and P_in is the actual inlet pressure at an inlet of the compressor. The formula used is:

$$m'\_corr = m'*(\mathrm{sqrt}(T\_in/T\_ref))/(P\_in/P\_ref)$$

If instead a reduced mass flow, m'_red, would be used, its formula is:

$$m'\_red = m'*(\mathrm{sqrt}\ T\_in)/P\_in$$

On the y-axis the pressure ratio is presented, i.e. the ratio between the total outlet pressure at an outlet of the compressor, P_out, and the total inlet pressure, P_in.

The compressor constant speed lines, n_corr, in the diagram are corrected constant speed lines, i.e. the compressor rotational speed related to a reference temperature, T_ref. The formula used is:

$$n\_corr = n/\mathrm{sqrt}(T\_in/T\_ref)$$

If instead a reduced rotational speed, n_red, would be used, its formula is:

$$n\_corr = n/\mathrm{sqrt}\ T\_in$$

Accordingly, the difference between the corrected mass flow and the reduced mass flow as well as between the corrected rotational speed and the reduced rotational speed lies in the scaling used.

Generally, to the left of the surge line, the operation of the compressor is unstable—compressor surge arises. To the right of the surge line, compressor operation is stable, although exceptions may occur. For instance, undesirable phenomena such as noise phenomena may occur also to the right of the surge line under certain ICE operating conditions.

Accordingly, the present invention in a general sense aims at maintaining the turbo compressor 50 operating to the right of the surge line 90 by limiting valve actuation changes, which if not limited would cause operation of the compressor 50 to the left of the surge line 90. A safety margin to the surge line 90 may be applied to ensure stable operation of the compressor 50 under all operating conditions of the ICE.

One example of such limited valve actuation changes is shown in FIG. 4. The turbo compressor 50 is operating in a position indicated with x in the compressor map 86. An ECU of the ICE 4 prepares to perform intended valve actuation changes towards target actuation settings, which would land the operating position of the compressor 50 at the position indicated with $x_i$ to the left of the surge line 90 in the compressor map 86. The control arrangement 38 intervenes and limits the valve actuation changes such that the operating position of the compressor 50 instead lands at the position indicated with $x_L$ on the right side of the surge line 90 in the compressor map 86.

Figure 5:
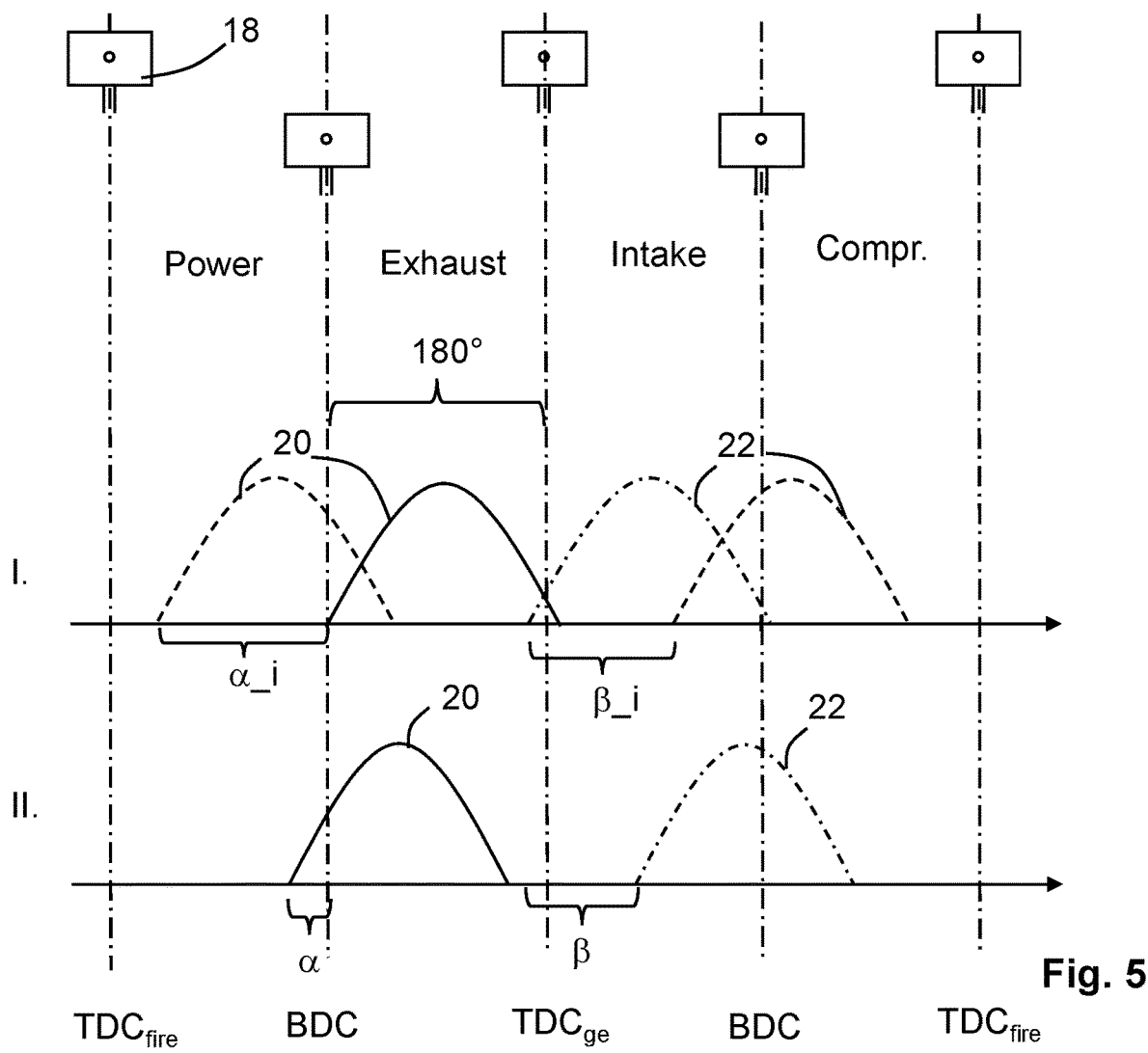
FIG. 5 illustrates diagrams over the ICE of FIG. 2.

FIG. 5 illustrates diagrams over the ICE 4 of FIG. 2, and control thereof in accordance with the discussion above referring to FIGS. 2-4. Accordingly, reference is also made to FIGS. 2-4.

FIG. 5 illustrates the four strokes of a piston 18 and the movements of the exhaust valve 20 (full line) and of the intake valve 22 (dash-dotted line) during operation of the ICE 4. The crankshaft 8 of the ICE 4 rotates 720 CA degrees as the four strokes of the piston 18 are performed. For each stroke, the crankshaft 8 rotates 180 CA degrees as indicated in FIG. 5. Purely to illustrate the limiting of the valve actuation changes, an example of such limiting is discussed with reference to lines I. and II. of FIG. 5.

Along line I. valve actuation, i.e. the opening and closing of the exhaust and intake valves 20, 22 during ordinary operation of the ICE 4 are shown. Also, the opening and closing of the exhaust and intake valves 20, 22 at target actuation settings are shown with broken lines. In the illustrated example, the target actuation settings relate to advancing the opening and closing of the exhaust valve 20 by $\alpha\_i$ CA degrees and delaying the opening and closing of the intake valve 22 by $\beta\_i$ CA degrees.

Along line II. the actual opening and closing of the exhaust and intake valves 20, 22 are shown, i.e. after limited valve actuation changes have been performed. The initially intended target actuation settings have be subjected to one kind of limiting, which results in reduced valve actuation changes in order to maintain a turbo compressor mass flow above a limit mass flow value and thus, to reduce risk of the compressor 50 operating in an unstable or undesirable operating region. In the illustrated example, the initially intended target actuation settings have been limited and resulted in a limited advancing of the opening and closing of the exhaust valve 20 of α CA degrees and limited delaying of the opening and closing of the intake valve 22 of β CA degrees, wherein $\alpha<\alpha\_i$ and $\beta<\beta\_i$.

Referring also to FIG. 4, the intended valve actuation changes the exhaust valve 20 of $\alpha\_i$ CA degrees and of the intake valve 22 of $\beta\_i$ CA degrees would cause unstable operation of the compressor 50 at the position indicated with $x_i$ in the compressor map 86. The limited valve actuation changes of the exhaust valve 20 of a CA degrees and of the intake valve 22 of β CA degrees will cause stable operation of the compressor 50 in the position indicated with $x_L$ in the compressor map 86.

The above may exemplify transition between operating points of the ICE 4, such as from high ICE load to low ICE load, or from heating of an exhaust system of the ICE to no heating thereof. Transitioning directly from a high load point with high stationary charge air pressure from the compressor 50 to a low load point with low stationary charge air pressure may result in compressor surge if the ICE mass flow as controlled by the valve actuation changes would be permitted to directly reach target actuation settings. The present invention provides for a maximum allowed reduction of ICE mass flow that the compressor is able to handle given the current charge air pressure and limits the valve actuation changes of the exhaust and intake valves 20, 22 accordingly.

Figures 6, 8:
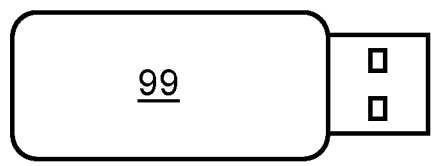
FIG. 6 illustrates an example of a compressor data table.
FIG. 8 illustrates embodiments of a computer-readable storage medium

FIG. 6 illustrates an example of a compressor data table of a typical turbo compressor 50 forming part of an ICE 4 for a vehicle 2. The data table provides corrected mass flow, m'_corr, values and pressure ratios, Pout/Pin, at corrected rotational speeds, n_corr. The surge limit data presented in the data table are the corrected mass flow, m'_corr, values forming surge limit mass flow, m'_corr_surge, values.

The data table exemplified is 3-dimensional. The data table may be used as a 2-dimensional data table by either utilizing current corrected rotational speed, n_corr, the current pressure ratio, Pout:Pin, to establish the corrected mass flow, m'_corr, for the current surge limit mass flow.

A manner of utilizing all three dimensions of the table may be to utilize both current corrected rotational speed, n_corr, and the current pressure ratio, Pout:Pin, to establish the corrected mass flow, m'_corr. For instance, by averaging between the two corrected mass flow, m'_corr, values established by each of the current corrected rotational speed, n_corr, and the current pressure ratio, Pout:Pin An alternative, would be to use the most limiting of the two corrected mass flows, m'_corr, i.e. the maximum, which corresponds to one of the current corrected rotational speed, n_corr, and the current pressure ratio, Pout:Pin.

Alternatively, the data table may be a 2-dimensional data table by including only one of the columns for pressure ratio, Pout/Pin, or corrected rotational speed, n_corr together with the corrected mass flow, m'_corr, for the current surge limit value.

Intermediate values, not presented in the data table, may be established e.g. by interpolation between two close values.

While the compressor map and data table surge line representations are easily visualizable, any algorithm to arrive at a representative surge line description would suffice for the applicability of the herein proposed method and control arrangement.

For instance, the slope of a straight line through the zero compressor corrected mass flow and unity compressor pressure ratio point, could serve as a simplified surge line model. The slope could be least squares fitted to available surge point data. This would be a single parameter surge model."

A further example may be to transform the compressor map variables into Phi and Psi-variables would reduce the compressor speed dependency, and could be used to define a single Phi_surge-value. In the turbo compressor development/research field the Phi and Psi-variables are commonly used. This could be used as a single parameter surge model.

A further alternative may be to utilize 3D Computational Fluid Dynamics, CFD, simulation and/or Large-eddy simulation, LES, to assess surge mass flow. The resulting simulated surge mass flow may be used in the herein proposed method and control arrangement.

As such, the exemplified representations of the turbo compressor 50—compressor map, compressor data table, and compressor/surge model-providing compressor data including surge limit data are known in the art. Other known means for providing compressor surge data may alternatively or complementary be utilized.

FIG. 7 illustrates embodiments of a method 100 for controlling valve actuation of an ICE. The ICE may be an ICE 4 comprising a control arrangement 38 as discussed above in connection with FIGS. 1-6. Accordingly, in the following reference is also made to FIGS. 1-6.

The method 100 comprises:
limiting 102 valve actuation changes of the exhaust and intake valves 20, 22 based on compressor data including surge limit data for the turbo compressor 50 and one or both of a current turbo compressor rotational speed and a current turbo compressor pressure ratio, to maintain a turbo compressor mass flow, m', above a limit mass flow value.

Maintaining the turbo compressor mass flow above the limit mass flow value entails that a stable operation of the turbo compressor 50 is achieved. In this manner, operation of the compressor 50 in unstable or undesirable operating regions of the compressor 50 is avoided or at least avoid to a substantial extent.

Accordingly, the step of limiting 102 the valve actuation changes of the exhaust and intake valves 20, 22 is applied to reduce risk of unstable or undesirable operation of the turbo compressor 50.

The pressure ratio over the compressor 50 and/or the rotational speed of the compressor 50 and the air temperature, T_in, at the inlet of the compressor 50 with the compressor data as provided e.g. by a compressor map 86, a compressor table, or a compressor model provides the mass flow, m', m'_corr, m'_red, of the turbo compressor 50.

The ideal gas law (common gas equation) applied to the cylinder arrangement 6, or cylinder arrangements, which are charged by the compressor 50, provides the mass flow through the relevant cylinder arrangement/s 6 of the ICE 4. More specifically, the inlet pressure and inlet temperature at the intake valve 22 provide the physical conditions. The air/gas volume enclosed in the cylinder arrangement/s 6 depends on the closing position of both valves 20, 22, i.e. the particular actuation settings of the exhaust and intake valves 20, 22 determine the air/gas volume enclosed and transported through the cylinder arrangement/s 6. The rotational speed of the ICE 4 then gives the mass flow through the cylinder arrangement/s 6 of the ICE 4.

A target mass flow through the cylinder arrangement/s 6 of the ICE 4 at target actuation settings (intended final positions) of the exhaust and intake valves 20, 22 is calculated and compared to a limit mass flow value, such as the surge limit mass flow, m'_surge, through the compressor 50 or the surge limit mass flow with a safety margin applied thereto.

Current compressor 50 operational conditions provide a corrected limit mass flow value, such as the corrected surge limit mass flow, m'_corr_surge, as established from a compressor map, data table, etc. as discussed above.

Due to the inherent lag in changes of the operating conditions of the turbo compressor 50, and the in comparison therewith much quicker changes in ICE 4 operating conditions occasioned by valve actuation changes, the current corrected limit mass flow value of the compressor 50 may be compared with the mass flow through the cylinder arrangement/s 6 of the ICE 4 at the target actuation settings of the exhaust and intake valves 20, 22.

In order to compare the thus, calculated mass flow of the ICE 4 with the current corrected surge limit mass flow, m'_corr_surge, the corrected surge limit mass flow, m'_corr_surge, may be converted into mass flow, m'_surge, for the compressor 50. This may be done by reverse calculation utilizing the above mentioned formula for calculating m'_corr i.e.:

$$m'\_surge = m'\_corr\_surge * (P\_in / P\_ref) / (\sqrt{(T\_in / T\_ref)})$$

The corresponding reverse calculation applies for reduced mass flow if instead of corrected mass flow, reduced mass flow is applied in a compressor table, data table, etc.

The outlet pressure, P_out, of the turbo compressor 50 may be directly measured by the compressor outlet pressure sensor 76 if it is arranged close to the outlet of the compressor 50. If the compressor outlet pressure sensor 76 is arranged further downstream of the compressor outlet, e.g. after an inter cooler (not shown) arranged in the inlet conduit 46, the outlet pressure, P_out, of the turbo compressor 50 may be calculated with knowledge about the pressure drop between the compressor outlet and the position of the pressure sensor 76.

The inlet pressure, P_in, of the turbo compressor 50 may be measured by a pressure sensor (not shown) arranged at the inlet of the turbo compressor 50. An alternative to measuring the inlet pressure, P_in, of the compressor 50 may be to calculate the inlet pressure of the compressor 50 based on measured ambient air pressure and with knowledge about the pressure drop from an air intake of the ICE 4 to the inlet of the compressor 50.

The pressure ratio, P_out:P_in, may be calculated based on the accordingly established outlet and inlet pressures of the compressor 50.

If the pressure drop from the compressor outlet pressure sensor 76 to the intake valve 22 is known, the inlet pressure at the intake valve 22 may be calculated based on the outlet pressure, P_out, of the turbo compressor 50 as measured by the compressor outlet pressure sensor 76. Otherwise, a pressure sensor may be provided close to the intake valve 22. Similarly, the temperature at the intake valve 22 may be calculated from the known inlet temperature, T_in, of the compressor 50, or a temperature sensor may be provided close to the intake valve 22.

The mass flow through the cylinder arrangement/s 6 of the ICE 4 is decisive for the turbo compressor-ICE-combination. Put differently, the turbo compressor 50 is not able to force a higher mass flow through the cylinder arrangement/s 6 of the ICE 4 than the mass flow drawn through the cylinder arrangement/s 6 of the ICE 4. Accordingly, a reduction in the mass flow through the cylinder arrangement/s 6 of the ICE 4 due to valve actuation changes of the valves 20, 22 will affect the mass flow, m', of the turbo compressor 50. Too large a valve actuation change may force the compressor 50 into unstable operation.

Accordingly, the mass flow through the cylinder arrangement/s 6 of the ICE 4 is controlled by the step of limiting 102 valve actuation changes of the valves 20, 22 to maintain the turbo compressor 50 mass flow, m', above the limit mass flow value for the turbo compressor 50. That is, the mass flow through the cylinder arrangement/s 6 of the ICE 4 does not force a mass flow upon the compressor 50 which would cause unstable or undesirable operation of the compressor 50.

The limit mass flow value of the compressor 50 depends on the operational parameters of the compressor 50 and is related to the surge line 90 as provided e.g. in a compressor map 86, a compressor table, or a compressor model.

Preceding the step of limiting 102, the method 100 may comprise:

providing 101 the compressor data including surge limit data for the turbo compressor 50, providing 103 current turbo compressor rotational speed and/or current turbo compressor pressure ratio, and initiating 105 valve actuation changes.

In embodiments of the ICE 4 wherein timing changes of the camshafts 10, 12 provide for valve actuation changes, the step of initiating 105 valve actuation changes may comprise initiating timing changes of the exhaust and intake camshafts 10, 12.

According to embodiments, the method 100 may further comprise:

determining 104 target actuation settings of the exhaust and intake valves 20, 22, and initiating 106 valve actuation changes of the exhaust and intake valves 20, 22 towards the target actuation setting of the exhaust and intake valves 20, 22, and wherein the step of limiting 102 the valve actuation changes may comprise:

preventing 108 the initiated valve actuation changes from reaching the target actuation settings of the exhaust and intake valves 20, 22, or increasing 109 a time period required for the valve actuation changes to reach the target actuation settings of the exhaust and intake valves 20, 22.

In this manner, unstable or undesirable operation of the turbo compressor 50 may be avoided by the step of limiting 102 the valve actuation changes applying one of the steps of preventing 108 the initiated valve actuation changes from reaching the target actuation settings of the exhaust and intake valves 20, 22, or increasing 109 a time period required for the valve actuation changes to reach the target actuation settings of the exhaust and intake valves 20, 22.

The mass flow through the cylinder arrangement 6 of the ICE 4 at the target actuation settings of the valves 20, 22 may be calculated in the manner discussed above. Thus, it may be determined whether the initiated valve actuation changes would require limiting in accordance with the step of limiting 102 the valve actuation changes in order to avoid unstable or undesirable operation of the turbo compressor 50.

Preventing 108 the initiated valve actuation changes from reaching the target actuation settings means that intended valve actuation changes, e.g. as determined by an ECU of the ICE, are not executed to their full extent, i.e. the target actuation settings are not reached. Thus, e.g. unstable operation of the turbo compressor 50 at the target actuation settings may be avoided.

Increasing 109 the time period required for the valve actuation changes to reach the target actuation settings means that it will take longer time for the intended valve actuation changes to be executed. For instance, when an ECU of the ICE would simply perform the initiated valve actuation changes within an as short timeframe as possible causing sudden changes in the mass flow through the cylinder arrangement/s 6 of the ICE 4, increasing the time period for reaching the target actuation settings permits a gradual change in charge air supply mass flow through the cylinder arrangement/s 6, which may prevent unstable or undesirable operation of the turbo compressor 50.

According to embodiments, the method 100, may further comprise:

determining 110 a target ICE mass flow at the target actuation settings of the valves 20, 22, and comparing 112 the target ICE mass flow with the limit mass flow value, and wherein if the target ICE mass flow reaches the limit mass flow value of the turbo compressor 50, then performing the step of:

limiting 102 the valve actuation changes of the exhaust and intake valves 20, 22.

By calculating the target ICE mass flow, i.e. the mass flow of air passing through the cylinder arrangement/s 6 of the ICE 4 at the target actuation settings of the exhaust and intake valves 20, 22, performing the step of comparing 112, and if necessary performing the step of limiting 102, situations where unstable or undesirable operation of the compressor would occur may be avoided.

According to some embodiments, the target actuation settings of the exhaust and intake valves 20, 22 in the step of determining 104 the target actuation settings may be determined based on ICE load and ICE rotational speed for controlling the exhaust and intake valves 20, 22 towards a particular fuel consumption level and/or towards a particular exhaust gas temperature.

Thus, the target actuation settings may be settings of the valves 20, 22 forming part of the normal ICE operation, wherein varying valve actuation is one component for achieving optimal or desired ICE operation.

According to embodiments, the limit mass flow value may be based on the surge limit data and the method 100 may comprise:

adapting 114 the limit mass flow value to a current ICE operating condition.

Thus, current operating conditions of the ICE 4 and the mass flow through the cylinder arrangement/s 6 of the ICE 4 may be considered when the limit mass flow value is set. For instance, the surge limit mass flow, $m'\_surge$, through the compressor 50, or the corresponding corrected surge limit mass flow, $m'\_corr\_surge$, may form the basis for the adapted limit mass flow value.

For instance, according to some embodiments, the current ICE operating condition may relate to a degree of change of ICE operation.

In this manner, the degree of change of ICE operation may be considered when adapting the limit mass flow value, above which the mass flow of the compressor 50 is to be maintained. The limit mass flow value may be larger for dynamic ICE operation or when abrupt changes in ICE operation are performed than when gradual changes in ICE operation are performed.

According to some embodiments, the step of adapting 114 the limit mass flow value may comprise:

providing 116 a larger safety margin to the surge limit data when the degree of change of ICE operation is an abrupt reduction of a torque request to the ICE 4, than when the degree of ICE operation is a gradual change in torque request to the ICE 4.

In this manner, unstable or undesired turbo compressor operation 50 may be avoided while taking account of different operating conditions of the ICE. Thus, the step of limiting 102 the valve actuation changes of the exhaust and intake valves 20, 22 may be performed closer to a surge limit mass flow through the compressor 50 under less dynamic ICE operation than when the ICE 4 is operated dynamically. Accordingly, a larger operating range of the turbo compressor 50 as well as a larger operating range of the ICE 4 without limitation of initiated valve actuation changes may be available than if the most dynamic ICE operation would dictate the limit mass flow value.

Mentioned as examples; abrupt changes/dynamic operation of the ICE 4 may occur when a so-called tip-in (~0%->~100% torque request) or tip-out (~100%->~0% torque request) is performed and during gear change operations in a transmission connected to the ICE 4. Gradual changes ICE 4 may occur when a cruise control controls vehicle speed on a stretch of road with minor gradients or when a vehicle decelerates or accelerates with a fixed torque request.

According to embodiments, the compressor data may comprise pressure ratio, mass flow and turbo compressor rotational speed provided in a data table.

The data table may be a data table or corresponding data table as shown in FIG. 6. Alternatively, the compressor data may be provided in a compressor map 86 as shown in FIG. 4 or similar map, or by a mathematical compressor model as discussed above.

According to a further aspect, there is provided a computer program comprising instructions which, when the program is executed by a computer, causes the computer to carry out a method 100 according to any one of aspects and/or embodiments discussed herein.

One skilled in the art will appreciate that the method 100 for controlling valve actuation may be implemented by programmed instructions. These programmed instructions are typically constituted by a computer program, which, when it is executed in a computer or calculation unit 60, ensures that the computer or calculation unit 60 carries out the desired control, such as the method 100, and at least some of the thereto related steps 102-116. The computer program is usually part of a computer-readable storage medium which comprises a suitable digital storage medium on which the computer program is stored.

FIG. 8 illustrates embodiments of a computer-readable storage medium 99 comprising instructions which, when executed by a computer or calculation unit 60, cause the computer or calculation unit 60 to carry out steps of the method 100 according to any one of aspects and/or embodiments discussed herein.

The computer-readable storage medium 99 may be provided for instance in the form of a data carrier carrying computer program code for performing at least some of the steps 102-116 according to some embodiments when being loaded into the one or more calculation units 60. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the calculation unit 60 remotely, e.g., over an Internet or an intranet connection, or via other wired or wireless communication systems.

The computer-readable storage medium 99 shown in FIG. 8 is a nonlimiting example in the form of a USB memory stick.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A method for controlling valve actuation of an internal combustion engine (ICE), the ICE comprising an exhaust valve, an intake valve, a turbo compressor, and an electronic control unit (ECU) for controlling operation of the ICE, wherein the method comprises:
   determining that the ECU is implementing valve actuation changes to the exhaust and intake valves based on target actuation settings determined by the ECU; and
   limiting and/or preventing such valve actuation changes from being implemented by the ECU, wherein said limiting of determined valve actuation changes is based on compressor data including surge limit data for the turbo compressor and one or both of a current turbo compressor rotational speed and a current turbo compressor pressure ratio, so as to maintain a turbo compressor mass flow above a limit mass flow value and prevent or limit compressor surge events.

2. The method according to claim 1, further comprising:
   determining the target actuation settings of the exhaust and intake valves; and
   initiating valve actuation changes of the exhaust and intake valves towards the target actuation settings of the exhaust and intake valves, and
   wherein the step of limiting the valve actuation changes comprises either:
      preventing the initiated valve actuation changes from reaching the target actuation settings of the exhaust and intake valves; or
      increasing a time period required for the valve actuation changes to reach the target actuation settings of the exhaust and intake valves.

3. The method according to claim 2, further comprising:
   determining a target ICE mass flow at the target actuation settings of the exhaust and intake valves; and
   comparing the target ICE mass flow with the limit mass flow value, and
   wherein if the target ICE mass flow reaches the limit mass flow value, then perform the step of:
      limiting the valve actuation changes of the exhaust and intake valves.

4. The method according to claim 2, wherein the target actuation settings of the exhaust and intake valves in the step of determining the target actuation settings are determined based on ICE load and ICE rotational speed for controlling the exhaust and intake valves towards a particular fuel consumption level and/or towards a particular exhaust gas temperature.

5. The method according to claim 1, wherein the limit mass flow value is based on the surge limit data and the method comprises:
   adapting the limit mass flow value to a current ICE operating condition.

6. The method according to claim 5, wherein the current ICE operating condition relates to a degree of change of ICE operation.

7. The method according to claim 6, wherein the step of adapting the limit mass flow value comprises:
   providing a larger safety margin to the surge limit data when the degree of change of ICE operation is an abrupt reduction of a torque request to the ICE, than when the degree of ICE operation is a gradual change in torque request to the ICE.

8. The method according to claim 1, wherein the compressor data comprise pressure ratio, mass flow and turbo compressor rotational speed provided in a data table.

9. A computer program product comprising computer program code stored on a non-transitory computer-readable medium, said computer program code configured for controlling valve actuation of an internal combustion engine (ICE the ICE comprising an exhaust valve, an intake valve, a turbo compressor, and an electronic control unit (ECU) for controlling operation of the ICE, said computer program code comprising computer instructions to cause at least one computing processor to perform the following operations:
  determining that the ECU is implementing valve actuation changes to the exhaust and intake valves based on target actuation settings determined by the ECU; and
  limiting and/or preventing such valve actuation changes from being implemented by the ECU, wherein said limiting of determined valve actuation changes is based on compressor data including surge limit data for the turbo compressor and one or both of a current turbo compressor rotational speed and a current turbo compressor pressure ratio, so as to maintain a turbo compressor mass flow above a limit mass flow value and prevent or limit compressor surge events.

10. A control arrangement for controlling valve actuation of an internal combustion engine (ICE), the ICE comprising an exhaust valve, an intake valve, a turbo compressor, and an electronic control unit (ECU) for controlling operation of the ICE, wherein the control arrangement is configured to:
  determine that the ECU is implementing valve actuation changes to the exhaust and intake valves based on target actuation settings determined by the ECU; and
  limit and/or prevent such valve actuation changes from being implemented by the ECU, wherein said limiting of determined valve actuation changes is based on compressor data including surge limit data for the turbo compressor and one or both of a current turbo compressor rotational speed and a current turbo compressor pressure ratio, so as to maintain a turbo compressor mass flow above a limit mass flow value and prevent or limit compressor surge events.

11. The control arrangement according to claim 10, further being configured to:
  determine the target actuation settings of the exhaust and intake valves;
  initiate valve actuation changes of the exhaust and intake valves towards the target actuation settings of the exhaust and intake valves; and
  either:
    prevent the initiated valve actuation changes from reaching the target actuation settings of the exhaust and intake valves; or
    increase a time period required for the valve actuation changes to reach the target actuation settings of the exhaust and intake valves.

12. The control arrangement according to claim 11, further being configured to:
  determine a target ICE mass flow at the target actuation settings of the exhaust and intake valves; and
  compare the target ICE mass flow with the limit mass flow value, and
  wherein if the target ICE mass flow reaches the limit mass flow value, the control arrangement is configured to:
  limit the valve actuation changes of the exhaust and intake valves.

13. An internal combustion engine (ICE), comprising:
  an exhaust valve;
  an intake valve;
  a turbo compressor;
  an electronic control unit (ECU) for controlling operation of the ICE; and
  a control arrangement configured to:
    determine that the ECU is implementing valve actuation changes to the exhaust and intake valves based on target actuation settings determined by the ECU; and
    limit and/or prevent such valve actuation changes from being implemented by the ECU, wherein said limiting of determined valve actuation changes is based on compressor data including surge limit data for the turbo compressor and one or both of a current turbo compressor rotational speed and a current turbo compressor pressure ratio, so as to maintain a turbo compressor mass flow above a limit mass flow value and prevent or limit compressor surge events.

14. A vehicle comprising an internal combustion engine (ICE), said ICE comprising:
  an exhaust valve;
  an intake valve;
  a turbo compressor;
  an electronic control unit (ECU) for controlling operation of the ICE; and
  a control arrangement configured to:
  determine that the ECU is implementing valve actuation changes to the exhaust and intake valves based on target actuation settings determined by the ECU; and
  limit and/or prevent such valve actuation changes from being implemented by the ECU, wherein said limiting of determined valve actuation changes is based on compressor data including surge limit data for the turbo compressor and one or both of a current turbo compressor rotational speed and a current turbo compressor pressure ratio, so as to maintain a turbo compressor mass flow above a limit mass flow value and prevent or limit compressor surge events.

15. The method according to claim 1, wherein limiting and/or preventing valve actuation changes comprises limiting and/or preventing valve actuation changes towards the target actuation settings of the exhaust and intake valves that are calculated by the ECU from being executed by the ECU.

16. A method for controlling valve actuation of an internal combustion engine (ICE), the ICE comprising an exhaust valve, an intake valve, and a turbo compressor, wherein the method comprises:
  limiting valve actuation changes of the exhaust and intake valves based on compressor data including surge limit data for the turbo compressor and one or both of a current turbo compressor rotational speed and a current turbo compressor pressure ratio, to maintain a turbo compressor mass flow above a limit mass flow value,
  wherein the limit mass flow value is based on the surge limit data and its value is adapted to a current ICE operating condition, and
  wherein the current ICE operating condition relates to a degree of change of ICE operation.

17. The method according to claim 16, wherein the step of adapting the limit mass flow value comprises:
  providing a larger safety margin to the surge limit data when the degree of change of ICE operation is an abrupt reduction of a torque request to the ICE, than when the degree of ICE operation is a gradual change in torque request to the ICE.

18. The method according to claim 16, further comprising:
- determining target actuation settings of the exhaust and intake valves; and
- initiating valve actuation changes of the exhaust and intake valves towards the target actuation settings of the exhaust and intake valves, and
- wherein the step of limiting the valve actuation changes comprises either:
  - preventing the initiated valve actuation changes from reaching the target actuation settings of the exhaust and intake valves; or
  - increasing a time period required for the valve actuation changes to reach the target actuation settings of the exhaust and intake valves.

19. The method according to claim 18, further comprising:
- determining a target ICE mass flow at the target actuation settings of the exhaust and intake valves; and
- comparing the target ICE mass flow with the limit mass flow value, and
- wherein if the target ICE mass flow reaches the limit mass flow value, then perform the step of:
  - limiting the valve actuation changes of the exhaust and intake valves.

20. The method according to claim 18, wherein the target actuation settings of the exhaust and intake valves in the step of determining the target actuation settings are determined based on ICE load and ICE rotational speed for controlling the exhaust and intake valves towards a particular fuel consumption level and/or towards a particular exhaust gas temperature.

* * * * *